Patented Oct. 24, 1950

2,527,372

UNITED STATES PATENT OFFICE 2,527,372

DIPHENYL HALO-THIOPHENE AND FUNGICIDAL COMPOSITIONS CONTAINING THE SAME

Clarence L. Moyle, Clare, and Lewis R. Drake, Midland, Mich., assignors to The Dow Chemical Company, Midland, Mich., a corporation of Delaware No Drawing. Application February 25, 1948, Serial No. 10,915

8 Claims. (Cl. 167—33)

This invention relates to the diphenyl halo-thiophenes and fungicidal compositions in which they are employed as a toxic ingredient for the control of fungus organisms.

The diphenyl halo-thiophenes of this invention are those wherein the phenyl groups and halogen atoms are substituted on the thiophene ring, according to the formula:

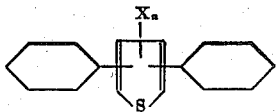

wherein X represents a member of the group consisting of chlorine and bromine, and $n$ is an integer not greater than 2.

Compounds of this group are crystalline solids or viscous oils, relatively insoluble in water, of low volatility, stable to light and air, and non-corrosive to the skin of man and higher animals. These new compounds may be prepared by the direct halogenation of diphenyl thiophene, whereby either one or two halogen atoms are substituted on the thiophen ring.

In the preferred method of operation diphenyl thiophene is dispersed in acetic acid or other non-reactive solvent, such as ethylene dichloride or chlorobenzene, acetic acid being the preferred medium for chlorination and ethylene dichloride for bromination. To the dispersion of diphenyl thiophene, halogen is added portionwise, with stirring, the temperature of the reaction mixture being held between 20° and 40° C. with an ice bath, if necessary. The halogen is employed in the amount of one or two molecular proportions to obtain the mono- or di-halogenated product, respectively. In the preparation of the diphenyl dihalothiophenes it is desirable that a 20 per cent excess of halogen be employed. Following completion of the reaction, the diphenyl dihalo-thiophenes or diphenyl monohalo-thiophenes may be separated either by fractional distillation or recrystallization, depending upon the nature of the crude product.

The diphenyl thiophenes employed in the foregoing operation may be prepared in isomeric mixture by reacting sulphur and styrene in substantially equimolecular proportions. The reaction is carried out by refluxing the styrene-sulphur mixture for six hours or longer at the boiling temperature of the reaction mixture, slightly increased yields being obtained when refluxing for longer periods of time. The diphenyl thiophenes may then be obtained by fractional distillation of the reaction mixture at atmospheric pressure.

The diphenyl halo-thiophenes have been found particularly valuable as agricultural fungicides. The compounds are characterized by a fortunate combination of properties whereby they are slowly dissipated from the point of contact, thus exerting a residual toxicity against fungus pests and controlling their growth over an extended period of time. The diphenyl halo-thiophenes may be applied to living vegetation in an amount sufficient to control the growth of fungus organisms without causing injury to roots, seeds, leaves, flowers, buds or fruit.

In addition to being useful as agricultural fungicides, they are adapted to be employed as preservatives for paper, paint, and wood, and as intermediates in the preparation of other organic derivatives.

The diphenyl halo-thiophenes may be compounded with various finely divided inert carriers such as bentonite, Fuller's earth, volcanic ash, diatomaceous earth, wood flours, talc and the like to form agricultural dusts. These dusts may be employed as concentrates and subsequently diluted with additional inert solid carrier or suspended in water or other inert liquid carrier to form sprays. The compounds may be dispersed in water or incorporated with various wetting, dispersing, sticking, and emulsifying agents and subsequently diluted to produce spray compositions containing the toxicant in any desired amount. Furthermore, the compounds may be incorporated in other conventional carriers such as solvents, oil-in-water emulsions or aerosols, either as the sole toxic ingredient or in combination with other fungicidal and insecticidal toxicants. Other toxicants used in such combinations must not react with the diphenyl halo-thiophenes in such a manner as to reduce their effectiveness or result in a mixture which is injurious to vegetation.

From about 5 to 95 per cent by weight of the diphenyl halo-thiophenes are employed in concentrates, and from about 0.03 to 10 per cent by weight in agricultural sprays and dusts. The exact amount of toxicant is largely determined by the susceptibility of the organism to be controlled, the tolerance of the plant under treatment, and the circumstances under which the control is to be accomplished.

In operating in accordance with this invention, good control of fungus organisms has been obtained with sprays containing at least 0.25 pound of the toxicant per 100 gallons. Such sprays may be applied to plants and plant parts in either dormant or summer applications. In spraying it is usually sufficient that the infected or susceptible surfaces be thoroughly wet with the liquid dispersion employed.

Dust compositions comprising from about 1 to 10 per cent by weight of the diphenyl halo-thiophenes are applied in such amounts that a relatively uniform coverage of the treated surfaces is obtained.

In other operations the diphenyl halo-thiophenes may be applied to fruit and vegetables to prevent the attack of fungus organisms during shipment and storage. Similarly, aqueous or oil spray compositions containing the compounds, may be applied to orchard floor surfaces and litter, either in the summer or fall, for the control of fungus organisms and spores in infected areas. Dormant plant surfaces may be thoroughly wet with such sprays to aid in the control of the overwintering spores of apple scab and related organisms.

The following examples set forth specific embodiments of the invention but are not to be construed as limiting the same.

*Example 1*

472 grams (2 moles) of diphenyl thiophene, boiling point 380°–400° C. at 755 millimeters pressure, suspended in 1500 grams of glacial acetic acid (25 moles) was placed in a flask equipped with a stirrer, reflux condenser, and chlorine inlet. 340.8 grams (4.8 moles) of chlorine was bubbled through the mixture over a period of two hours, while stirring, the temperature of the mixture being held between 20° and 40° C. by means of an ice bath. A diphenyl dichloro-thiophene product precipitated from the reaction mixture. This material was separated by filtration, washed with water and methanol, and dried. In a similar manner two additional batches of diphenyl dichloro-thiophene were prepared from the same diphenyl thiophene. The three lots were then combined and the combined product was found upon analysis to have a chlorine content of 22.5 per cent and a melting point of 96°–97° C. The theoretical chlorine content for $C_{16}H_{10}Cl_2S$ is 23.3 per cent.

*Example 2*

118 grams (0.5 mole) of diphenyl thiophene, melting point 110°–116° C. (which corresponds to the product designated 3,4-diphenyl thiophene in Beilstein, Handbuch der Organische Chemie, ed. 4, first supplement, vol. 17, page 36), was suspended in 350 milliliters of ethylene dichloride and 160 grams (2 moles) of bromine was added portionwise over a period of one hour, with stirring, the temperature of the mixture being held between 20° and 40° C. with an ice bath. A diphenyl dibromo-thiophene precipitated from the reaction mixture, and was separated to obtain a product, which upon analysis was found to have a bromine content of 39.27 per cent. The theoretical bromine content for $C_{16}H_{10}Br_2S$ is 40.4 per cent.

*Example 3*

130 grams (0.55 mole) of diphenyl thiophene having a melting point of 119°–121° C. (reported in Beilstein, first supplement, vol. 17, page 81 as 2,4-diphenyl thiophene), was suspended in 200 milliliters of acetic acid. To this mixture 44 grams (0.55 mole) of chlorine was added over a period of one hour and in a manner similar to that of Example 1. The reaction mixture was then poured into an excess of water and the diphenyl monochloro-thiophene product separated as a viscous oil. On standing, this oil partially solidified at room temperature. The crystalline fraction was separated. Upon analysis the residue oil and solid product were found to contain 13.76 per cent and 12.39 per cent of chlorine, respectively. The theoretical chlorine content for $C_{16}H_{11}ClS$ is 13.12 per cent.

*Example 4*

100 grams (0.425 mole) of diphenyl thiophene was suspended in 350 grams (3.55 moles) of ethylene dichloride and 62 grams (0.39 mole) of bromine added portionwise, while stirring, over a period of ½ hour, the temperature being held between 20° and 40° C. A diphenyl monobromo-thiophene product was separated as an oil from the reaction mixture by fractional distillation under reduced pressure. This product partially solidified at room temperature and upon analysis was found to have a bromine content of 25.73 per cent. The bromine content for $C_{16}H_{11}BrS$ is 25.4 per cent.

*Example 5*

2,5-diphenyl thiophene, melting point 150°–152° C., was suspended in acetic acid and chlorinated with gaseous chlorine to obtain 2,5-diphenyl dichloro-thiophene, having a melting point of 127°–129° C. and a chlorine content of 21.7 per cent.

The fungicidal application of the new compounds is illustrated by the following examples:

*Example 6*

Four parts by weight of diphenyl dichloro-thiophene, having a melting point 110–116° C., and one part by weight of sodium lauryl sulphate were dispersed in a small quantity of water and ballmilled for 2½ hours. The resulting concentrate was dispersed in water to obtain a spray composition containing one pound of diphenyl dichloro-thiophene and 0.25 pound of sodium lauryl sulphate per 100 gallons. A second spray composition containing 3 pounds of diphenyl dichloro-thiophene and 0.25 pound of sodium lauryl sulphate per 100 gallons was prepared in a similar manner. These compositions were sprayed on two different stands of cranberry bean plants, and the plants subsequently inoculated with bean mildew. Eleven days after inoculation both stands were inspected to determine the control of bean mildew and found to be free of mildew and to display no chemical injury. In a control operation with a stand of cranberry bean plants upon which no fungicide had been applied, the plants were found to be covered with mildew eleven days following inoculation.

*Example 7*

The two spray compositions of Example 6 were applied to the stem and leaf surfaces of stands of bean, coleus, buckwheat, mint, nasturtium, snapdragon, and tomato plants. Two weeks following the application the plants were examined for evidence of chemical injury. Diphenyl dichloro-thiophene at both one pound and 3 pounds per 100 gallons was found to have caused no injury to these plants.

*Example 8*

50 parts by weight of the diphenyl monobromo-thiophene was dissolved in 40 parts by weight of xylene. 10 parts by weight of dimeric alkylated aryl polyether alcohol (Triton X-155) was added to this solution and the resulting mixture dispersed in water to obtain two spray compositions, one containing one pound and the other 3 pounds of toxicant per 100 gallons. These compositions were sprayed on two different stands of cranberry bean plants and the plants subsequently inoculated with bean mildew. Nineteen days following the inoculation, both stands of plants were examined and found to be free of mildew and to exhibit no sign of chemical injury. In a control stand of cranberry bean plants upon which no fungicide had been applied, the plants were found covered with mildew nineteen days after inoculation.

*Example 9*

A concentrate having the following composition by weight was prepared by mixing and grinding the constituents and screening to $\frac{1}{32}$ inch particle size:

| | Per cent |
|---|---|
| Diphenyl dichloro-thiophene (compound prepared in Example 1) | 50 |
| Triton X-155) dimeric alkylated aryl polyether alcohol | 2 |
| (Daxad No. 27) sodium salt of a condensed alkyl aryl sulfonic acid | 2 |
| Fuller's earth | 46 |

The concentrate was dispersed in water to produce a spray composition containing 2 pounds of toxicant per 100 gallons. Four applications of the spray, spaced over a period of 24 days, were made for the control of blight on a stand of tomato plants. Twelve days following the last application, the sprayed plants were examined to ascertain the control of blight. The disease was found to have been held in satisfactory control and without chemical injury to the plants. Untreated tomato plants were likewise inspected and found to have suffered sufficient leaf surface damage that the productiveness of the plants was materially reduced.

*Example 10*

50 parts by weight of the diphenyl dichloro-thiophene described in Example 1 and 50 parts of fuller's earth were mixed and ground twice through a $\frac{1}{32}$ inch screen. This material was mixed with a pyrophyllite (Pyrax) and ground through a $\frac{1}{8}$ inch screen to obtain a dust composition containing 10 per cent of the toxicant. Four applications of the dust, spaced over a period of 30 days, were made for the control of blight on a stand of tomato plants. Eleven days following the last application the dusted plants were examined to ascertain the control of blight. As in Example 9, the disease had been held in satisfactory control and without chemical injury to the plants. Untreated tomato plants, however, had suffered sufficient leaf surface damage that their productiveness was materially reduced.

*Example 11*

Four applications of the spray composition of Example 9, spaced over a period of 41 days, were made in an apple orchard containing a heavy natural infection of apple scab. 22 days following the last application, the sprayed trees were examined to estimate the control of apple scab. The spray program was found to have accomplished substantially complete control of new lesions without causing injury to the foliage. The development of scab on the foliage of untreated trees was found to have continued unchecked.

We claim:

1. A diphenyl halo-thiophene having the formula

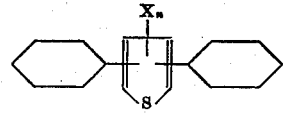

wherein X represents a member of the group consisting of chlorine and bromine, and $n$ is one of the integers 1 and 2.

2. A diphenyl dichloro-thiophene, wherein both chlorine atoms are substituted on the thiophene ring.

3. A diphenyl monochloro-thiophene, wherein the chlorine atom is substituted on the thiophene ring.

4. A diphenyl monobromo-thiophene, wherein the bromine atom is substituted on the thiophene ring.

5. A fungicide composition comprising a product of claim 1 as an active toxic ingredient dispersed in an inert carrier, the active toxic ingredient being present in the amount of at least 0.03 per cent by weight of the composition.

6. A fungicide composition comprising a diphenyl dichloro-thiophene of claim 2 as an active toxic ingredient dispersed in an inert carrier, the active toxic ingredient being present in the amount of at least 0.03 per cent by weight of the composition.

7. A fungicide spray composition comprising a diphenyl dichloro-thiophene of claim 2 as an active toxic ingredient dispersed in water, the active toxic ingredient being present in the amount of at least 0.25 pound per 100 gallons of solution.

8. A fungicide dust composition comprising a diphenyl dichloro-thiophene of claim 2 as an active toxic ingredient dispersed in a finely divided inert solid carrier, the active toxic ingredient being present in the amount of at least 1 per cent by weight of the dust.

CLARENCE L. MOYLE.
LEWIS R. DRAKE.

REFERENCES CITED

The following references are of record in the file of this patent:

UNITED STATES PATENTS

| Number | Name | Date |
|---|---|---|
| 1,934,803 | Kharash | Nov. 14, 1933 |
| 2,010,841 | Bender | Aug. 13, 1935 |
| 2,085,065 | Andersen | June 29, 1937 |
| 2,299,240 | Kranglein | Oct. 20, 1942 |

FOREIGN PATENTS

| Number | Country | Date |
|---|---|---|
| 812,749 | France | May 15, 1937 |

OTHER REFERENCES

J. Am. Chem. Soc. 41, 1382-3 (1919).
Alles, J. Pharm. & Exp. Therapy 72, 265 (1941). (Copy in 260—345.)